United States Patent
Jung et al.

(10) Patent No.: US 8,773,769 B2
(45) Date of Patent: *Jul. 8, 2014

(54) LENS MODULE

(71) Applicant: Samsung Electro-Mechanics Co., Ltd., Suwon (KR)

(72) Inventors: Phil Ho Jung, Suwon (KR); Young Gi Kim, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/105,105

(22) Filed: Dec. 12, 2013

(65) Prior Publication Data

US 2014/0104480 A1 Apr. 17, 2014

Related U.S. Application Data

(63) Continuation of application No. 13/588,208, filed on Aug. 17, 2012, now Pat. No. 8,675,288.

(30) Foreign Application Priority Data

Jun. 12, 2012 (KR) .................. 10-2012-0062652

(51) Int. Cl.
*G02B 13/18* (2006.01)
*G02B 9/60* (2006.01)
*G02B 13/00* (2006.01)
*H04N 5/225* (2006.01)

(52) U.S. Cl.
CPC .............. *G02B 9/60* (2013.01); *G02B 13/0045* (2013.01); *G02B 13/18* (2013.01); *H04N 5/2254* (2013.01)
USPC .......................................... 359/714; 359/764

(58) Field of Classification Search
CPC ........ G02B 1/00; G02B 1/04; G02B 13/0045; G02B 13/06; G02B 13/22
USPC .......................................... 359/714, 763, 764
See application file for complete search history.

(56) References Cited

U.S. PATENT DOCUMENTS 8,035,723 B2 10/2011 Sano
8,072,695 B1 12/2011 Lee
(Continued)

FOREIGN PATENT DOCUMENTS

JP 2011-039091 2/2011
JP 2011-085733 A 4/2011
(Continued)

OTHER PUBLICATIONS

Office Action dated Sep. 25, 2013 from corresponding Japanese Patent Application No. 2012-181553 and its English summary provided by the clients.

(Continued)

*Primary Examiner* — David N Spector
(74) *Attorney, Agent, or Firm* — Ladas & Parry, LLP

(57) ABSTRACT

There is provided a lens module, including: a first lens having positive refractive power, an object-sided surface thereof being convex; a second lens having negative refractive power, an image-sided surface thereof being concave; a third lens having positive refractive power; a fourth lens having negative refractive power, an image-sided surface thereof being convex; and a fifth lens having negative refractive power, an image-sided surface thereof being concave, wherein the fourth lens satisfies Conditional Expression 1, $$\frac{f4}{f} < -3.0 \quad \text{[Conditional Expression 1]}$$

where f is an overall focal distance of an optical system and f4 is a focal distance of the fourth lens.

16 Claims, 10 Drawing Sheets

(56) References Cited

U.S. PATENT DOCUMENTS

| | | | |
|---|---|---|---|
| 8,179,615 B1* | 5/2012 | Tang et al. | 359/714 |
| 8,264,784 B2* | 9/2012 | You | 359/773 |
| 8,395,851 B2* | 3/2013 | Tang et al. | 359/714 |
| 8,411,376 B2 | 4/2013 | Kubota | |
| 8,498,061 B2 | 7/2013 | Sano | |
| 8,520,124 B2 | 8/2013 | Ozaki | |
| 8,675,288 B2* | 3/2014 | Jung et al. | 359/714 |
| 2007/0229984 A1 | 10/2007 | Shinohara | |
| 2010/0220229 A1 | 9/2010 | Sano | |
| 2010/0253829 A1 | 10/2010 | Shinohara | |
| 2013/0088788 A1 | 4/2013 | You | |

FOREIGN PATENT DOCUMENTS

| | | |
|---|---|---|
| JP | 2013-11710 A | 1/2013 |
| JP | 2013-54099 A | 3/2013 |
| KR | 10-2007-0097369 | 10/2007 |
| KR | 10-2011-0042382 | 4/2011 |
| KR | 10-2011-0140040 | 12/2011 |
| KR | 10-2012-0018573 | 3/2012 |
| KR | 10-2012-0033866 | 4/2012 |
| WO | 2010/024198 | 3/2010 |

OTHER PUBLICATIONS

Notice of Allowance dated Nov. 6, 2013 for U.S. Appl. No. 13/588,208.

Office Action dated Jan. 28, 2014 and Prior Art Search Report for corresponding Korean Patent Application No. 10-2013-0150984 and its English translation provided by the Applicant's foreign counsel.

Non-Final Office Action dated Mar. 4, 2014 for U.S. Appl. No. 14/105,096.

Non-Final Office Action dated Feb. 4, 2014 for U.S. Appl. No. 14/105,122.

* cited by examiner (a)

(b)

(c)

SPHERICAL ABERRATION

ASTIGMATISM ABERRATION

DISTORTION ABERRATION

LENS MODULE

CROSS-REFERENCE TO RELATED APPLICATIONS

This application is a continuation application of U.S. patent application Ser. No. 13/588,208 of Aug. 17, 2012, which claims the priority of Korean Patent Application No. 10-2012-0062652 filed on Jun. 12, 2012, in the Korean Intellectual Property Office, the disclosure of which is incorporated by reference in their entireties.

BACKGROUND OF THE INVENTION

1. Field of the Invention

The present invention relates to a lens module for a camera, and more particularly, to a lens module capable of realizing a high-resolution performance and a bright optical system.

2. Description of the Related Art

Recent mobile communications terminals have a camera provided therewith, allowing for video communications and photography. In addition, as the functionality of cameras included in mobile terminals has gradually increased, cameras for a mobile terminal have gradually been required to have high resolution and high functionality.

However, there is a trend for mobile terminals to be smaller and a lighter weight, and thus, there may be a limit in realizing a highly-functional camera having high-resolution.

In order to solve these limits, recently, the lens of the camera has been formed of plastic having a lighter weight than glass, and 4 or more lenses constituting a lens module have been provided to realize high resolution.

However, an improvement of chromatic aberration is more difficult in a lens made of plastic than in a lens made of glass, and also, it is difficult to realize a relatively bright optical system in the plastic lens as compared to the glass lens.

Meanwhile, Patent Documents 1 and 2 disclose lens modules for realizing a high-resolution camera in the related art.

(Patent Document 1) KR2012-018573 A (Patent Document 2) KR2007-097369 A

SUMMARY OF THE INVENTION

An aspect of the present invention provides a lens module capable of realizing a high-resolution performance and a bright optical system.

According to an aspect of the present invention, there is provided a lens module, including: a first lens having positive refractive power, an object-sided surface thereof being convex; a second lens having negative refractive power, an image-sided surface thereof being concave; a third lens having positive refractive power; a fourth lens having negative refractive power, an image-sided surface thereof being convex; and a fifth lens having negative refractive power, an image-sided surface thereof being concave, wherein the fourth lens satisfies Conditional Expression 1, $$\frac{f4}{f} < -3.0 \quad \text{[Conditional Expression 1]}$$

where f is an overall focal distance of an optical system and f4 is a focal distance of the fourth lens.

The first lens and the fourth lens may satisfy Conditional Expression 2, $$20 < \upsilon_1 - \upsilon_4 < 40 \quad \text{[Conditional Expression 2]}$$

where $\upsilon1$ is an abbe number of the first lens, and $\upsilon4$ is an abbe number of the fourth lens.

The first lens and the fourth lens may satisfy Conditional Expression 3, $$\frac{f4}{f1} < -5.0 \quad \text{[Conditional Expression 3]}$$

where f1 is a focal distance of the first lens, and f4 is the focal distance of the fourth lens.

The lens module may satisfy Conditional Expression 4, $$0.5 < \frac{TL}{f} < 2.0 \quad \text{[Conditional Expression 4]}$$

where TL is a distance from the object-sided surface of the first lens to an upper surface of an image sensor, and f is the overall focal distance of the optical system.

The third lens may have a convex image-sided surface.

The fourth lens may have a meniscus shape.

The fifth lens may have at least one inflection point formed on the image-sided surface thereof.

According to another aspect of the present invention, there is provided a lens module, including: a first lens having positive refractive power, an object-sided surface thereof being convex; a second lens having negative refractive power, an image-sided surface thereof being concave; a third lens having a meniscus shape convex toward an image; a fourth lens having negative refractive power, an image-sided surface thereof being convex; and a fifth lens having negative refractive power, an image-sided surface thereof being concave, wherein the fourth lens satisfies Conditional Expression 1, $$\frac{f4}{f} < -3.0 \quad \text{[Conditional Expression 1]}$$

where f is an overall focal distance of an optical system and f4 is a focal distance of the fourth lens.

The first lens and the fourth lens may satisfy Conditional Expression 2, $$20 < \upsilon_1 - \upsilon_4 < 40 \quad \text{[Conditional Expression 2]}$$

where $\upsilon1$ is an abbe number of the first lens, and $\upsilon4$ is an abbe number of the fourth lens.

The first lens and the fourth lens may satisfy Conditional Expression 3, $$\frac{f4}{f1} < -5.0 \quad \text{[Conditional Expression 3]}$$

where f1 is a focal distance of the first lens, and f4 is the focal distance of the fourth lens.

The lens module may satisfy Conditional Expression 4, $$0.5 < \frac{TL}{f} < 2.0 \quad \text{[Conditional Expression 4]}$$

where TL is a distance from the object-sided surface of the first lens to an upper surface of an image sensor, and f is the overall focal distance of the optical system.

The third lens may be convex toward the image.

The fifth lens may have at least one inflection point formed on at least one of an object-sided surface and the image-sided surface thereof.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Hereinafter, embodiments of the present invention will be described in detail with reference to the accompanying drawings.

In describing the present invention below, terms indicating components of the present invention are named in consideration of functions thereof. Therefore, the terms should not be understood as limiting technical components of the present invention.

For reference, it is to be noted that, in the present specification, the term "front" refers to a direction toward an object from a lens module, while the term "rear" refers to a direction toward an image sensor from a lens module. In addition, it is to be noted that, in each lens, a first surface refers to a surface toward an object and a second surface refers to a surface adjacent to an image.

Figure 1:
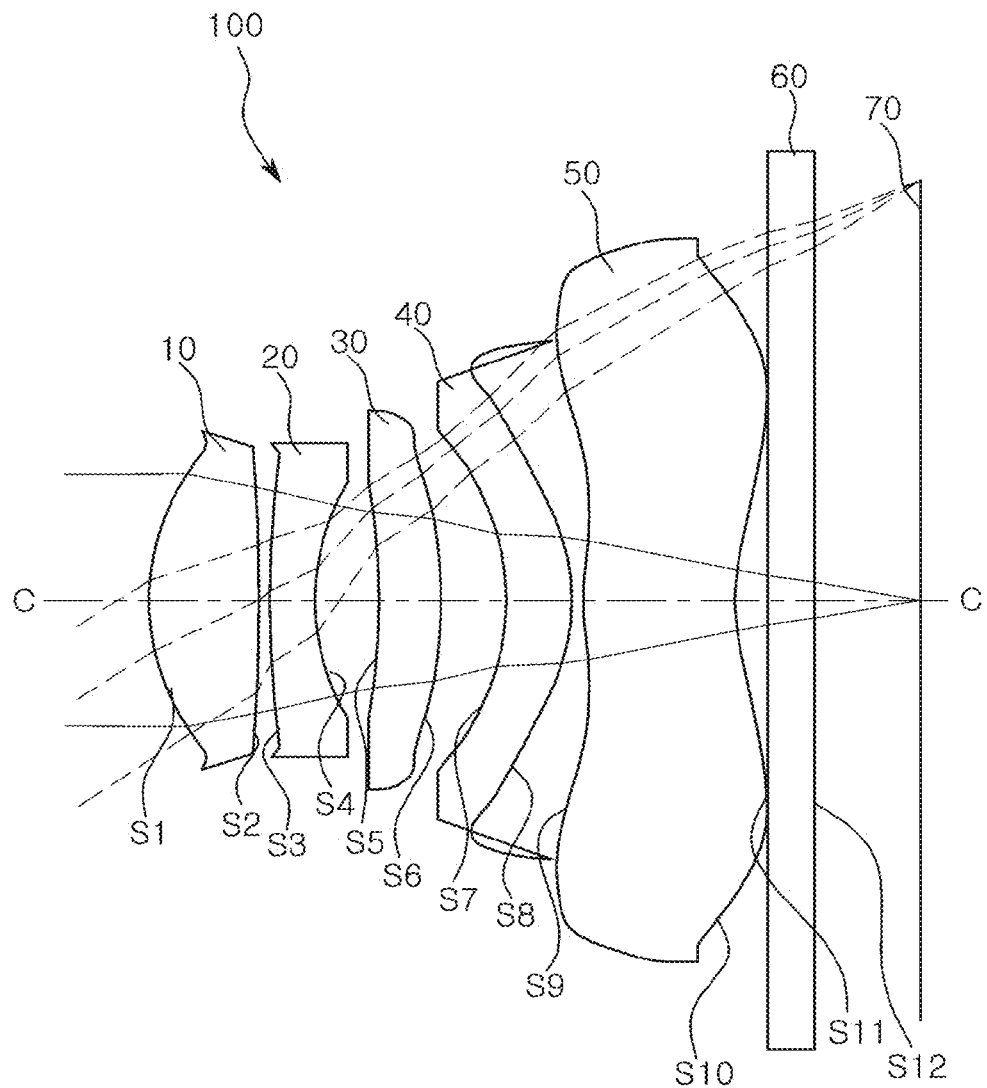
FIG. 1 is a structural view of a lens module according to a first embodiment of the present invention.
Figure 2:
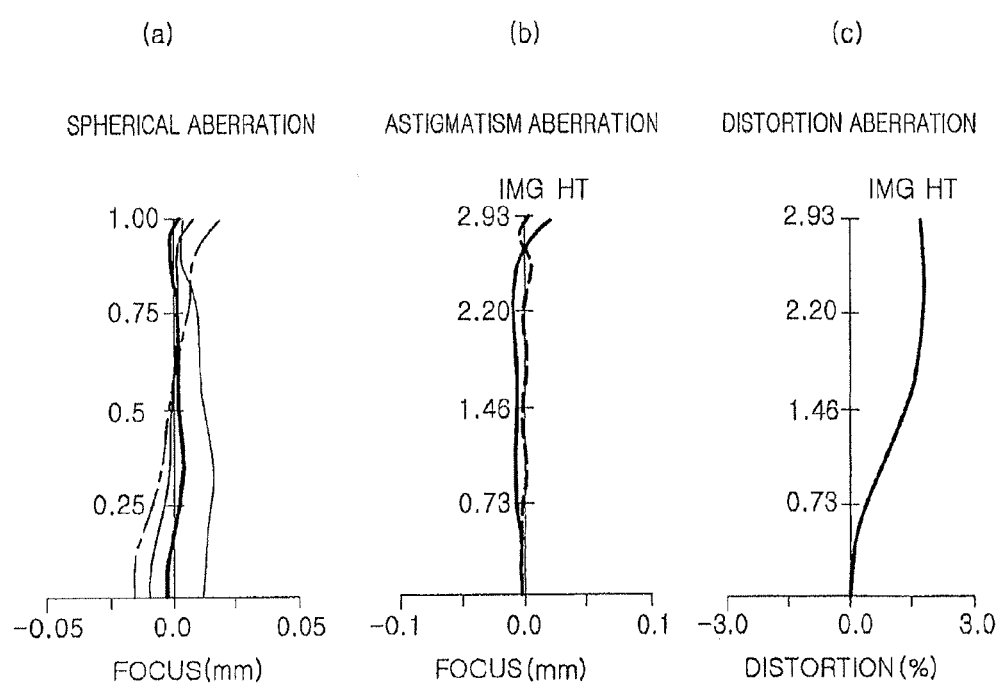
FIGS. 2A, 2B, and 2C are graphs showing aberration characteristics of the lens module of FIG. 1.
Figure 3:
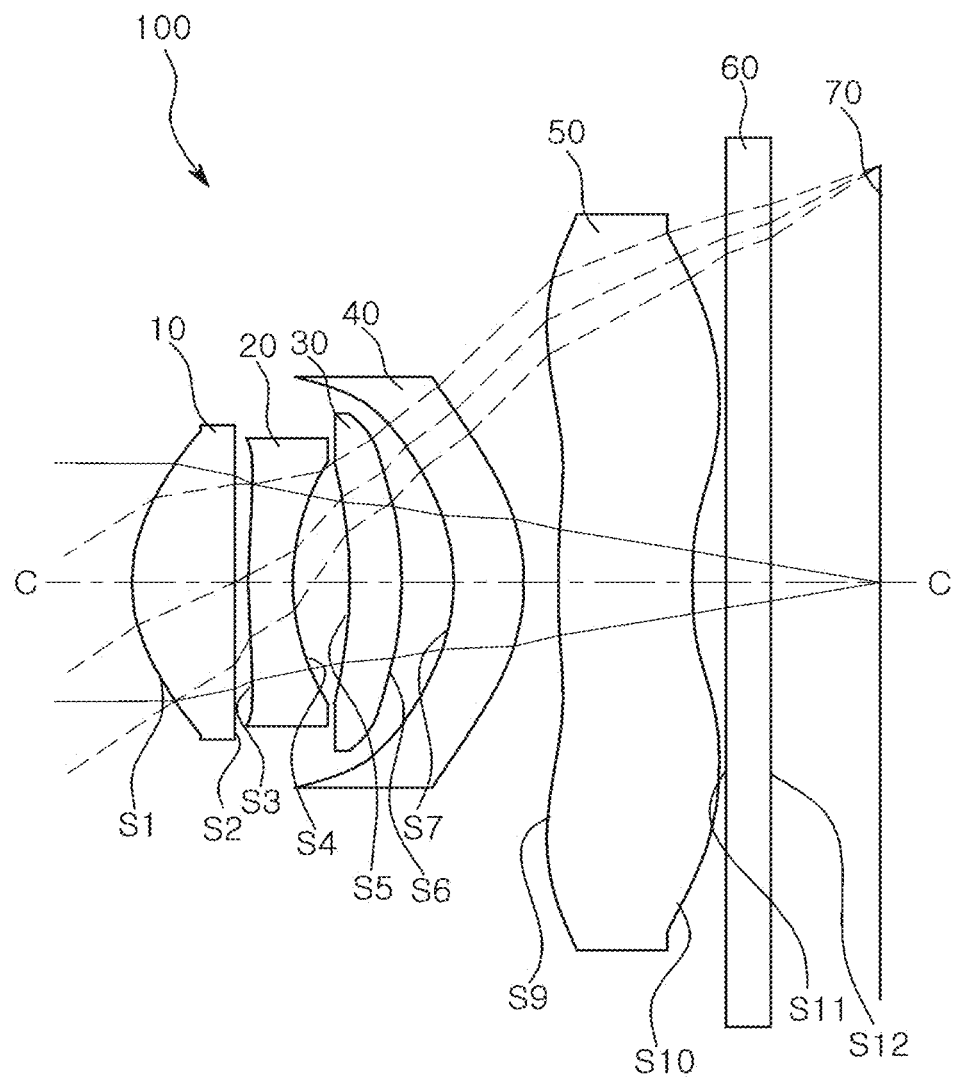
FIG. 3 is a structural view of a lens module according to a second embodiment of the present invention.
Figure 4:
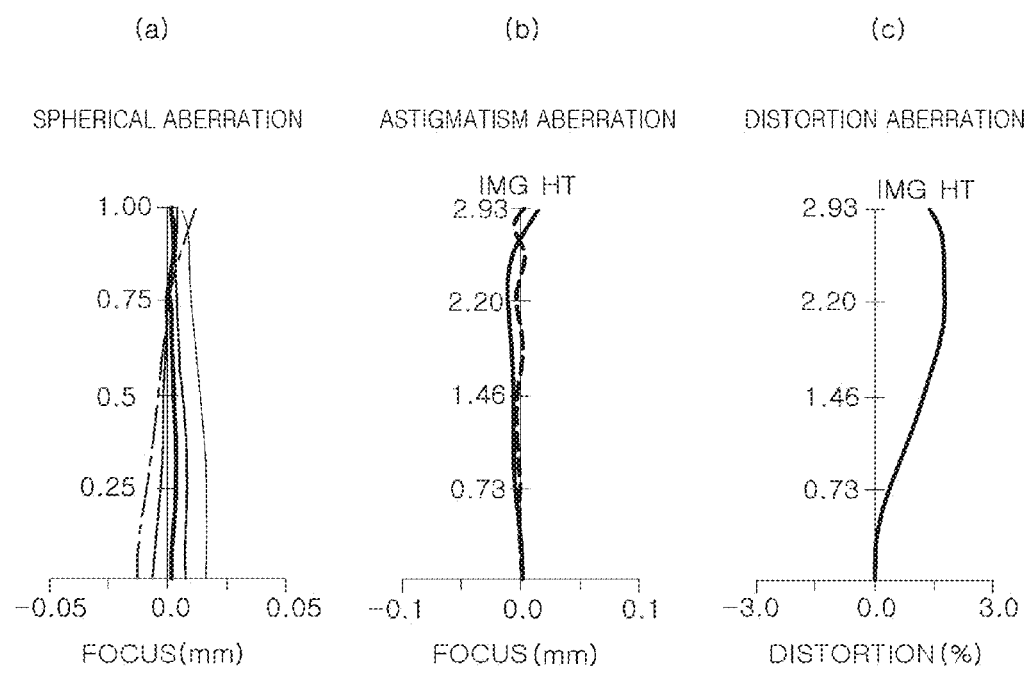
FIGS. 4A, 4B, and 4C are graphs showing aberration characteristics of the lens module of FIG. 3.
Figure 5:
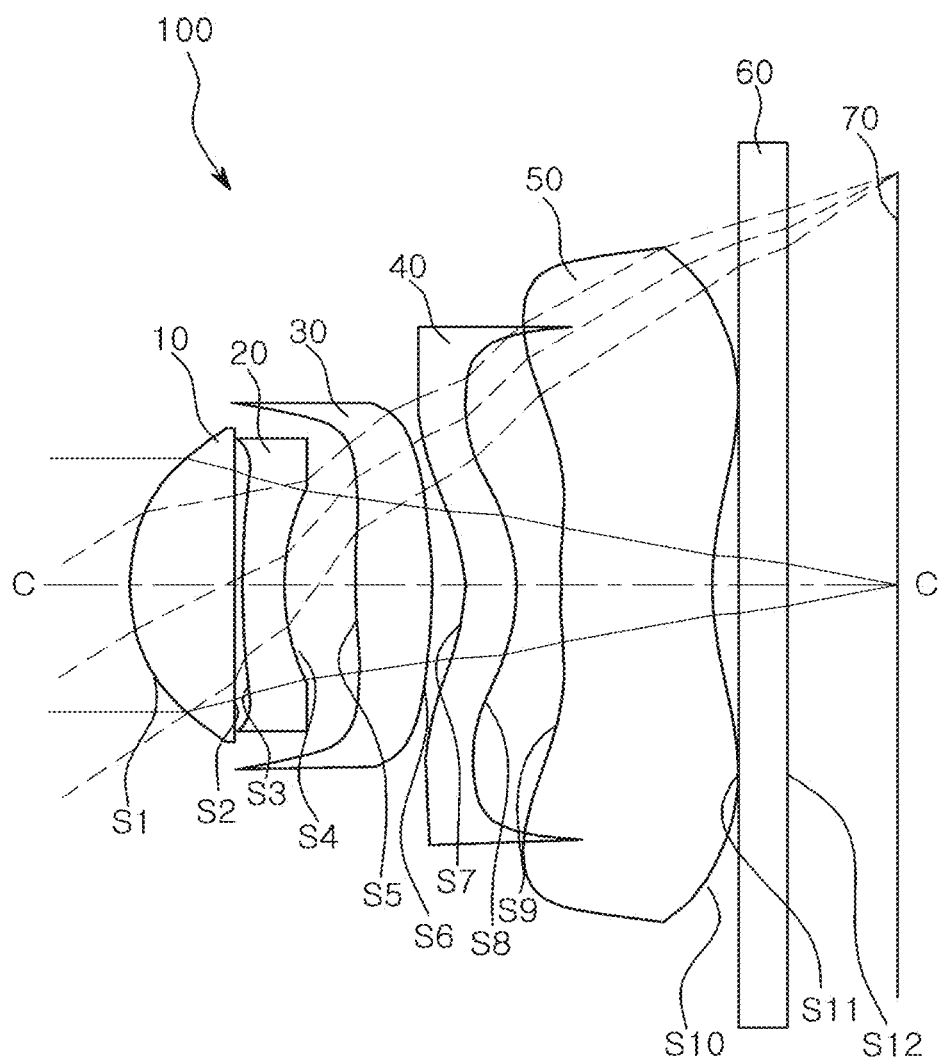
FIG. 5 is a structural view of a lens module according to a third embodiment of the present invention.
Figure 6:
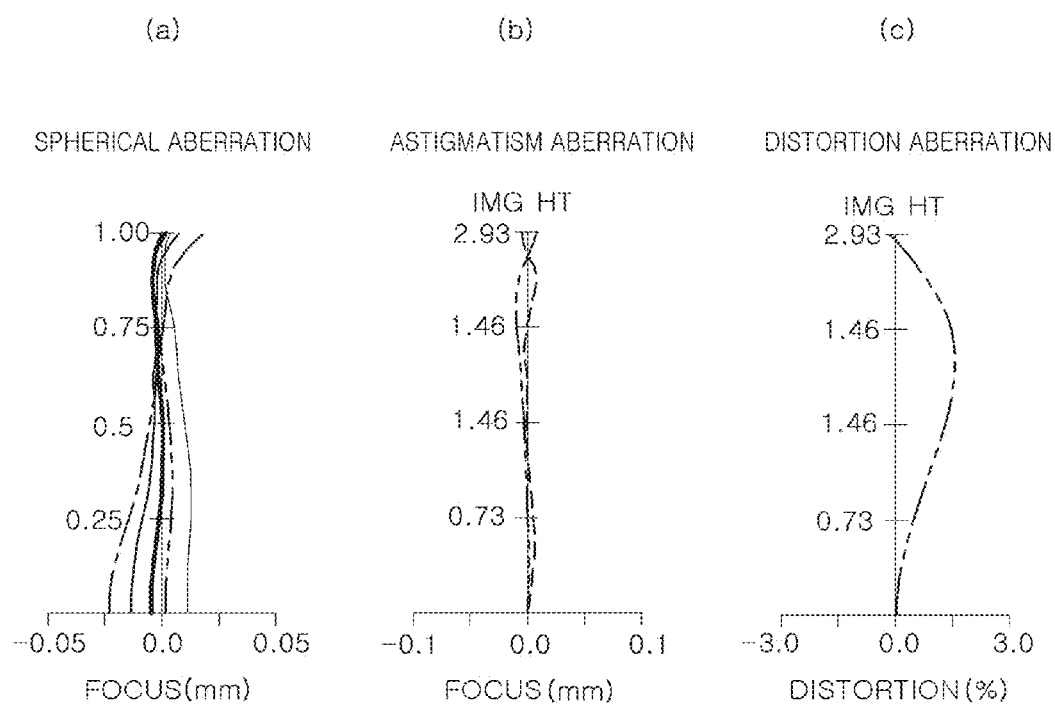
FIGS. 6A, 6B, and 6C are graphs showing aberration characteristics of the lens module of FIG. 5.
Figure 7:
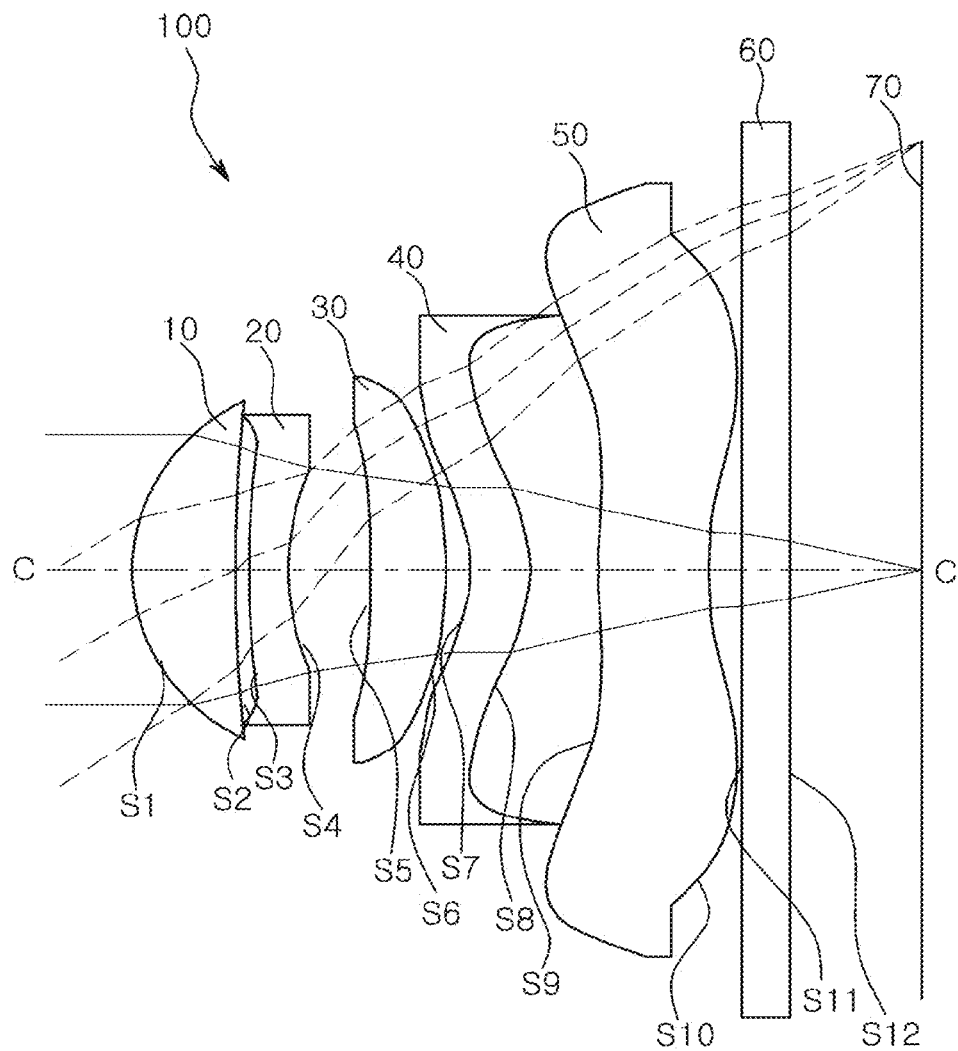
FIG. 7 is a structural view of a lens module according to a fourth embodiment of the present invention.
Figure 8A:
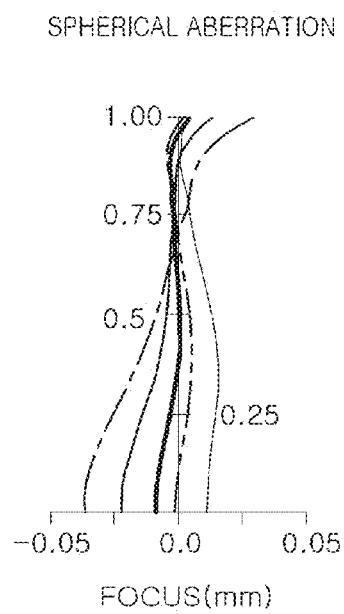
FIGS. 8A, 8B, and 8C are graphs showing aberration characteristics of the lens module of FIG. 7.
Figure 8B:
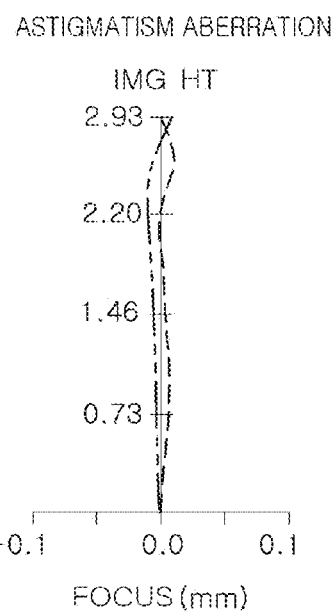
Figure 8C:
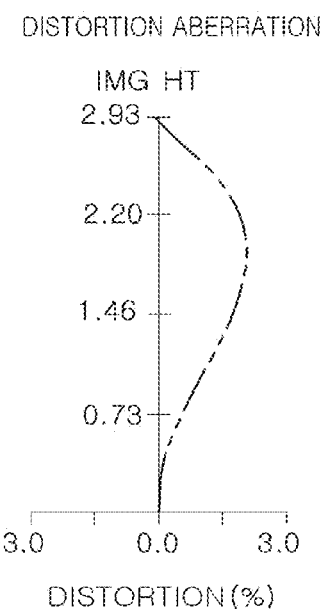
Figure 9:
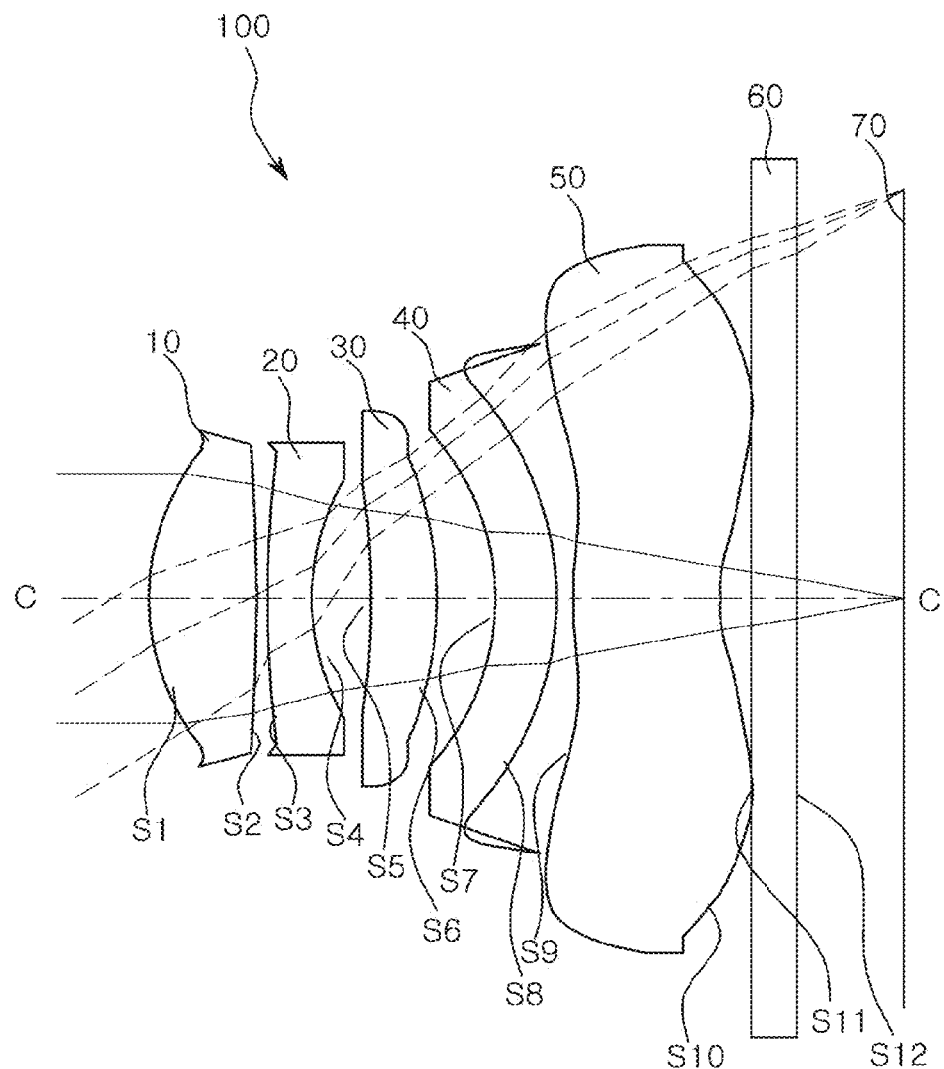
FIG. 9 is a structural view of a lens module according to a fifth embodiment of the present invention.
Figures 10A, 10B, 10C:
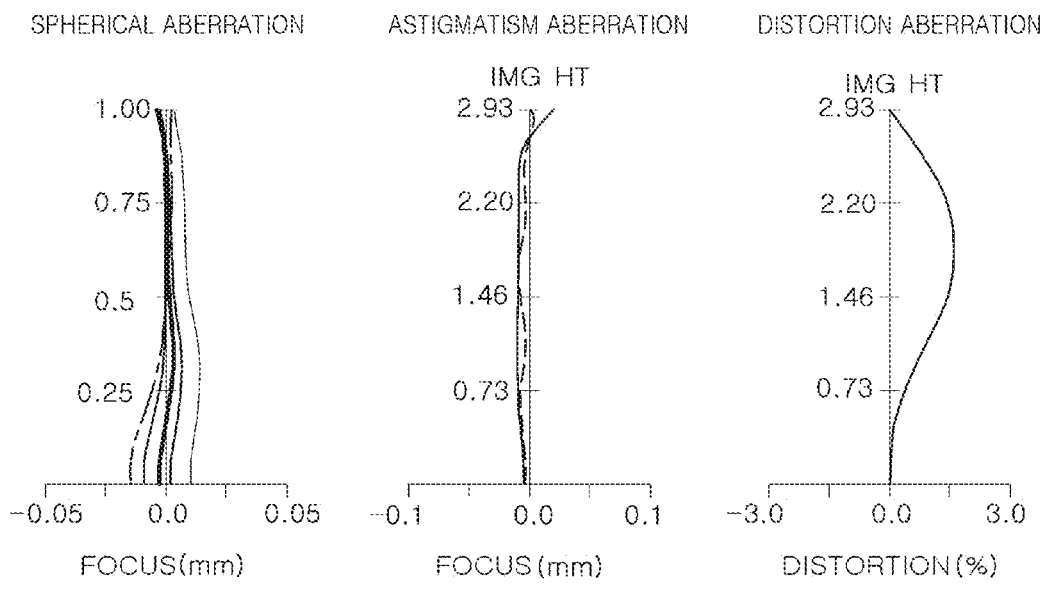
FIGS. 10A, 10B, and 10C are graphs showing aberration characteristics of the lens module of FIG. 9.

FIG. 1 is a structural view of a lens module according to a first embodiment of the present invention; FIGS. 2A, 2B, and 2C are graphs showing aberration characteristics of the lens module of FIG. 1; FIG. 3 is a structural view of a lens module according to a second embodiment of the present invention; FIGS. 4A, 4B, and 4C are graphs showing aberration characteristics of the lens module of FIG. 3; FIG. 5 is a structural view of a lens module according to a third embodiment of the present invention; FIGS. 6A, 6B, and 6C are graphs showing aberration characteristics of the lens module of FIG. 5; FIG. 7 is a structural view of a lens module according to a fourth embodiment of the present invention; FIGS. 8A, 8B, and 8C are graphs showing aberration characteristics of the lens module of FIG. 7; FIG. 9 is a structural view of a lens module according to a fifth embodiment of the present invention; and FIGS. 10A, 10B, and 10C are graphs showing aberration characteristics of the lens module of FIG. 9.

A lens module 100 according to the present invention may include a first lens 10, a second lens 20, a third lens 30, a fourth lens 40, and a fifth lens 50, and may selectively further include an aperture and a filter member 60, and an image sensor 70. The first lens 10 to the fifth lens 50 may be sequentially disposed from an object (that is, a subject or an object to be photographed) toward an image (that is, the image sensor).

The first lens 10, the second lens 20, the third lens 30, the fourth lens 40, and the fifth lens 50 may be all formed of plastic. As such, when all the lenses 10, 20, 30, 40 and 50 are formed of plastic, the manufacturing cost of the lens module 100 may be reduced and the lens modules 100 may be conveniently mass-produced. In addition, when the lenses 10, 20, 30, 40, and 50 are formed of plastic, first and second surfaces S1, S2, S3, S4, S5, S6, S7, S8, S9, and S10 of the lenses are easily processed, and thus, the surfaces of the lenses may be formed to have a spherical or aspherical shape.

In the lens module 100, the first lens 10 may be disposed closest to the object.

The first lens 10 may have positive refractive power overall. In addition, the first surface S1 of the first lens 10 may be convex toward the object, and the second surface S2 thereof may be convex toward the image. In detail, the first surface S1 may be more convex than the second surface S2.

At least one of the first surface S1 and the second surface S2 of the first lens 10 may be aspherical. However, as needed, both of the first surface S1 and the second surface S2 of the first lens 10 may be aspherical.

The second lens 20 may be disposed in the rear of the first lens 10 (that is, in the direction toward the image). The second lens 20 may have negative refractive power overall, and may be formed of plastic in like manner to the first lens 10.

The first surface S3 of the second lens 20 may be convex toward the object, and the second surface S4 thereof may be concave toward the object. In addition, the second lens 20 may have at least one aspherical surface. For example, at least one of the first surface S3 and the second surface S4 of the second lens 20 may be aspherical. However, as needed, both of the first surface S3 and the second surface S4 of the second lens 20 may be aspherical.

The second lens 20 may have an abbe number satisfying Mathematical Expression 1 below.

$$\nu 2 < 40 \qquad \text{[Mathematical Expression 1]}$$

Here, $\cup 2$ is the abbe number of the second lens.

As such, when the abbe number of the second lens 20 is below 40, chromatic aberration caused by the first lens 10 may be effectively corrected. When the abbe number of the second lens 20 is above 40, a difference between an abbe number of the first lens 10 and the abbe number of the second lens 20 may be reduced (In general, the abbe number of the first lens 10 is between 50 and 60), such that a chromatic aberration correction effect through the second lens 20 may be deteriorated. Therefore, the second lens 20 may be manufactured in such a manner that the abbe number thereof is below 40, as supposed in Mathematical Expression 1. The abbe number of the second lens 20 may be 20 to 30.

The third lens 30 may be disposed in the rear of the second lens 20. The third lens 30 may have positive refractive power overall, and may be formed of plastic. However, as needed, the third lens 30 may have negative refractive power.

The first surface S5 of the third lens 30 may be concave, and the second surface S6 thereof may be convex toward the image. Here, in some cases, the first surface S5 of the third lens 30 may be convex toward the object (please refer to the third embodiment of the present invention shown in FIG. 5).

Meanwhile, the second lens 20 and the third lens 30 as described above may satisfy Mathematical Expression 2.

$$-3.0 < \frac{f3}{f2} < -0.3 \quad \text{[Mathematical Expression 2]}$$

Here, f2 is a focal distance of the second lens 20 and f3 is a focal distance of the third lens 30.

In the lens module, if a value of f3/f2 is below the lower limit according to Mathematical Expression 2, the refractive power of the second lens may be increased, and thus, it may be difficult to manufacture the second lens. In the same manner, in the lens module, if the value of f3/f2 is above the upper limit according to Mathematical Expression 2, the refractive power of the third lens may be increased, and thus, it may be difficult to manufacture the third lens.

Therefore, it is desirable to satisfy conditions for Mathematical Expression 2 to allow for mass-production of the lens module.

The fourth lens 40 may be disposed in the rear of the third lens 30. The fourth lens 40 may have negative refractive power, and may be formed of plastic.

The first surface S7 of the fourth lens 40 may be concave, and the second surface S8 thereof may be convex toward the image. In addition, the fourth lens 40 may have a meniscus shape, convex toward the image, overall.

The fourth lens 40 may satisfy Mathematical Expressions 3 to 5.

$$20 - \upsilon 1 - \upsilon 4 < 40 \quad \text{[Mathematical Expression 3]}$$

Here, ∪1 is the abbe number of the first lens, and ∪4 is an abbe number of the fourth lens.

Mathematical Expression 3 may be a limitation condition with respect to chromatic aberration of the lens module. That is, when a lens module satisfying Mathematical Expression 3 is manufactured, the chromatic aberration correction effect may be improved through the first lens 10 and the fourth lens 40. However, if a value of ∪1–∪4 is below the lower limit according to Mathematical Expression 3, a lens of glass needs to be used, and thus, unit costs for manufacturing the lens module 100 may be increased. Unlike this, if the value of ∪1–∪4 is above the upper limit according to Mathematical Expression 3, the chromatic aberration correction effect may be deteriorated, and thus, it may be difficult to manufacture a lens module capable of realizing high resolution.

$$\frac{f4}{f1} < -5.0 \quad \text{[Mathematical Expression 4]}$$

Here, f1 is a focal distance of the first lens, and f4 is a focal distance of the fourth lens.

Mathematical Expression 4 may be a limitation condition for limiting the refractive power of the fourth lens 40. That is, if a value of f4/f1 is above the upper limit according to Mathematical Expression 4, the refractive power of the fourth lens 40 in the lens module may be increased, and thus, resolution of the lens module 100 may be deteriorated or an overall length of the lens module 100 (that is, an overall length of the optical system) may be increased.

$$\frac{f4}{f} < -3.0 \quad \text{[Mathematical Expression 5]}$$

Here, f is an overall focal distance of the lens module, and f4 is the focal distance of the fourth lens.

Mathematical Expression 5 may be a limitation condition for limiting the refractive power of the fourth lens 40, like Mathematical Expression 4. That is, if a value of f4/f is above the upper limit according to Mathematical Expression 5, the (negative) refractive power of the fourth lens 40 in the lens module may be increased, and thus, resolution of the lens module 100 may be deteriorated or the overall focal distance of the lens module may become excessively small, so that distortion correction may be difficult (or a viewing angle of the lens module may be excessively large, and thus, a distortion phenomenon may occur).

Therefore, Mathematical Expression 4 and Mathematical Expression 5 all may need to be satisfied in order to decrease the overall length of the lens module 100.

The fifth lens 50 may be disposed in the rear of the fourth lens 40. The fifth lens 50 may have negative refractive power, and may be formed of plastic.

The first surface S9 of the fifth lens 50 may be convex toward the object at an intersection thereof with an optical axis (C-C) and may be concave at a peripheral portion thereof based on the optical axis (C-C). In addition, the second surface S10 of the fifth lens 50 may be concave at an intersection thereof with the optical axis (C-C) and may be convex at a peripheral portion thereof based on the optical axis (C-C). That is, at least one inflection point may be formed on the first surface S9 and the second surface S10 of the fifth lens 50.

The filter member 60 may be disposed in the rear of the fifth lens 50. Both surfaces of the filter member 60 may flat planes, and may be formed of a material other than plastic. For example, the filter member 60 may be formed of glass.

The filter member 60 may block infrared light. To achieve this, an IR blocking film may be attached to, or an IR blocking layer may be coated on, at least one surface of the filter member 60. Meanwhile, the filter member 60 may be omitted, depending on the type of the lens module 100.

The image sensor 70 may be disposed in the rear of the filter member 60.

The image sensor 70 may convert an image of the object, incident through the lenses 10, 20, 30, 40, and 50 into an electric signal. A charge-coupled device (CCD), complementary metal-oxide-semiconductor (CMOS), or the like, may be used for the image sensor 70, and the image sensor 70 may be manufactured in the form of chip scale package (CSP).

The aperture (not shown) may be disposed in front of the first lens 10 or between the first lens 10 and the second lens 20. However, the aperture may be omitted as needed.

The lens module 100 as described above may satisfy Mathematical Expression 6.

$$0.5 < \frac{TL}{f} < 2.0 \quad \text{[Mathematical Expression 6]}$$

Here, TL is an overall length of the optical system (a length from the first surface S1 of the first lens to an upper surface of the image sensor 70), and f is the overall focal distance of the optical system.

Mathematical Expression 6 may be a numerical value for limiting the viewing angle and the length of the lens module. That is, if a value of TL/f is below the lower limit according to Mathematical Expression 6, it may be difficult to obtain the viewing angle of the lens module 100. On the contrary, if the value of TL/f is above the upper limit according to Mathematical Expression 6, the length (that is, TL) of the lens module 100 is extended, and thus, it is difficult to manufacture the lens module 100 so as to have a small size.

Meanwhile, at least one surface of the first lens 10 to the fourth lens 40 may be aspherical. Aspherical coefficients of the lenses may be calculated by using Mathematical Expression 7.

$$z = \frac{ch^2}{1 + SQRT\{1 - (1+k)c^2h^2\}} + Ah^4 + Bh^6 + Ch^8 + Dh^{10} + Eh^{12} + Fh^{14}$$

[Mathematical Expression 7]

Here, c is curvature (1/radius of curvature), h is a radius from the center to a specific position in the lens, K is a conic coefficient, A is a $4^{th}$-order coefficient, B is a $6^{th}$-order coefficient, C is an $8^{th}$-order coefficient, D is a $10^{th}$-order coefficient, E is an $12^{th}$-order coefficient, F is a $14^{th}$-order coefficient, and Z is sag at the specific position.

For reference, K, A, B, C, D, E, and F values for respective embodiments are shown in Tables 2, 4, 6, 8, and 10.

The lens module 100 as constructed above may realize high resolution through numerical limitations according to Mathematical Expressions 1 to 5, and may be miniaturized.

In addition, the lens module 100 may improve brightness of the lens module 100 by limiting the focal distance of the fourth lens 40 through Mathematical Expressions 4 and 5.

Tables 1 to 10 below show numeral values in several embodiments of the lens module 100 having the above construction.

First Embodiment

The lens module 100 according to the first embodiment of the present invention will be described with reference to FIGS. 1, 2A, 2B, and 2C.

The lens module 100 according to the first embodiment may include the first lens 10 having positive refractive power, the second lens 20 having negative refractive power, the third lens 30 having positive refractive power, the fourth lens 40 having negative refractive power, and the fifth lens 50 having negative refractive power.

TABLE 1

| Surface No. | Radius of Curvature | Thickness or Distance | Refractive Index | Abbe No. (v) |
|---|---|---|---|---|
| S1 | 1.381 | 0.63 | 1.544 | 56.1 |
| S2 | 8.924 | 0.09 | | |
| S3 | 4.656 | 0.30 | 1.632 | 23.4 |
| S4 | 1.988 | 0.37 | | |
| S5 | −6.107 | 0.37 | 1.544 | 56.1 |
| S6 | −2.683 | 0.42 | | |
| S7 | −1.294 | 0.44 | 1.635 | 24 |
| S8 | −1.591 | 0.10 | | |
| S9 | 2.674 | 0.86 | 1.544 | 56.1 |
| S10 | 1.684 | 0.18 | | |
| S11 | Infinity | 0.30 | 1.517 | 64.2 |
| S12 | Infinity | 0.71 | | |
| img | Infinity | | | |

In the lens module 100 of the present embodiment, the focal distance f1 of the first lens 10 is 2.91 mm; the focal distance f2 of the second lens 20 is −5.68 mm; the focal distance f3 of the third lens 30 is 8.44 mm; the focal distance f4 of the fourth lens 40 is −25.61 mm; the focal distance f5 of the fifth lens 50 is −12.01 mm; the overall focal distance f is 4.12 mm; and F number (F No.) is 2.40. Meanwhile, TL according to the embodiment is 4.77 mm, the smallest among the accompanying embodiments, together with Embodiment 2.

TABLE 2

| Surface No. | K | A | B | C | D | E | F |
|---|---|---|---|---|---|---|---|
| S1 | −1.857E−01 | 8.822E−03 | 2.769E−02 | −5.482E−02 | 6.735E−02 | −2.650E−03 | −3.576E−02 |
| S2 | 0.000E+00 | −1.533E−01 | 3.258E−01 | −4.407E−01 | 3.643E−01 | −1.995E−01 | 0.000E+00 |
| S3 | 0.000E+00 | −2.557E−01 | 4.932E−01 | −5.532E−01 | 3.437E−01 | −1.596E−01 | 0.000E+00 |
| S4 | 3.390E+00 | −1.678E−01 | 2.501E−01 | −1.168E−01 | −1.009E−01 | 7.702E−02 | 0.000E+00 |
| S5 | 0.000E+00 | −1.242E−01 | 3.027E−02 | 5.238E−02 | 1.532E−01 | −1.558E−01 | −3.302E−02 |
| S6 | 0.000E+00 | −4.577E−02 | −2.435E−02 | 9.005E−02 | 8.243E−02 | −1.060E−01 | 1.767E−02 |
| S7 | −7.750E+00 | −1.172E−01 | 2.440E−02 | 3.182E−02 | 1.992E−02 | −4.579E−02 | 1.490E−02 |
| S8 | −7.074E+00 | −1.305E−01 | 6.054E−02 | 5.414E−03 | −6.086E−03 | −1.476E−03 | 6.415E−04 |
| S9 | −1.756E+01 | −1.810E−01 | 8.834E−02 | −1.984E−02 | 2.252E−03 | −1.045E−04 | 0.000E+00 |
| S10 | −8.176E+00 | −6.832E−02 | 1.848E−02 | −3.813E−03 | 4.408E−04 | −1.997E−05 | 0.000E+00 |

Second Embodiment

The lens module 100 according to the second embodiment of the present invention will be described with reference to FIGS. 3, 4A, 4B, and 4C.

The lens module 100 according to the second embodiment may include the first lens 10 having positive refractive power, the second lens 20 having negative refractive power, the third lens 30 having positive refractive power, the fourth lens 40 having negative refractive power, and the fifth lens 50 having negative refractive power.

TABLE 3

| Surface No. | Radius of Curvature | Thickness or Distance | Refractive Index | Abbe No. (v) |
|---|---|---|---|---|
| S1 | 1.406 | 0.65 | 1.544 | 56.1 |
| S2 | 11.651 | 0.09 | | |
| S3 | 4.624 | 0.28 | 1.632 | 23.4 |
| S4 | 1.950 | 0.37 | | |
| S5 | −6.459 | 0.33 | 1.544 | 56.1 |
| S6 | −2.625 | 0.33 | | |
| S7 | −1.220 | 0.44 | 1.635 | 24 |
| S8 | −1.419 | 0.22 | | |
| S9 | 3.379 | 0.85 | 1.544 | 56.1 |
| S10 | 1.759 | 0.21 | | |

TABLE 3-continued

| Surface No. | Radius of Curvature | Thickness or Distance | Refractive Index | Abbe No. (ν) |
|---|---|---|---|---|
| S11 | Infinity | 0.30 | 1.517 | 64.2 |
| S12 | Infinity | 0.70 | | |
| img | Infinity | | | |

In the lens module 100 of the present embodiment, the focal distance f1 of the first lens 10 is 2.86 mm; the focal distance f2 of the second lens 20 is −5.50 mm; the focal distance f3 of the third lens 30 is 7.85 mm; the focal distance f4 of the fourth lens 40 is −100.00 mm; the focal distance f5 of the fifth lens 50 is −8.24 mm; the overall focal distance f is 4.12 mm; and F No. is 2.40. In addition, TL according to the embodiment is 4.77, the smallest, together with the first embodiment.

TABLE 4

| Surface No. | K | A | B | C | D | E | F |
|---|---|---|---|---|---|---|---|
| S1  | −1.279E−01 |  5.285E−03 | 1.100E−02 | −2.319E−02 |  1.870E−02 |  1.418E−02 | −3.576E−02 |
| S2  |  0.000E+00 | −1.403E−01 | 3.172E−01 | −4.893E−01 |  4.199E−01 | −2.180E−01 |  0.000E+00 |
| S3  |  0.000E+00 | −2.361E−01 | 4.952E−01 | −5.972E−01 |  3.879E−01 | −1.596E−01 |  0.000E+00 |
| S4  |  2.060E+00 | −1.456E−01 | 2.874E−01 | −1.720E−01 |  7.661E−03 |  7.702E−02 |  0.000E+00 |
| S5  |  0.000E+00 | −1.194E−01 | 4.204E−02 | −3.706E−02 |  2.576E−01 | −1.654E−01 | −3.302E−02 |
| S6  |  0.000E+00 | −3.044E−02 | 7.503E−03 | −1.392E−02 |  1.149E−01 | −3.098E−02 | −3.233E−02 |
| S7  | −5.304E+00 | −8.453E−02 | 3.411E−02 | −1.067E−02 |  2.377E−02 | −2.645E−02 |  5.479E−03 |
| S8  | −4.342E+00 | −7.572E−02 | 3.027E−02 |  9.316E−03 | −4.083E−03 | −2.132E−03 |  6.763E−04 |
| S9  | −1.756E+01 | −1.537E−01 | 6.951E−02 | −1.396E−02 |  1.386E−03 | −5.457E−05 |  0.000E+00 |
| S10 | −8.176E+00 | −6.808E−02 | 1.964E−02 | −4.242E−03 |  5.018E−04 | −2.250E−05 |  0.000E+00 |

Third Embodiment

The lens module 100 according to the third embodiment of the present invention will be described with reference to FIGS. 5, 6A, 6B, and 6C.

The lens module 100 according to the third embodiment may include the first lens 10 having positive refractive power, the second lens 20 having negative refractive power, the third lens 30 having positive refractive power, the fourth lens 40 having negative refractive power, and the fifth lens 50 having negative refractive power.

Here, the first surface S5 of the third lens 30 may be convex toward the object, unlike the other embodiments. In addition, the fourth lens 40 may have an inflection point at a peripheral portion based on the optical axis (C-C) as shown in FIG. 5.

TABLE 5

| Surface No. | Radius of Curvature | Thickness or Distance | Refractive Index | Abbe No. (ν) |
|---|---|---|---|---|
| S1  | 1.436    | 0.64 | 1.544 | 56.1 |
| S2  | 6.630    | 0.08 |       |      |
| S3  | 3.358    | 0.27 | 1.632 | 23.4 |
| S4  | 1.706    | 0.45 |       |      |
| S5  | 13.188   | 0.48 | 1.544 | 56.1 |
| S6  | −3.790   | 0.22 |       |      |
| S7  | −1.061   | 0.33 | 1.614 | 25.6 |
| S8  | −1.207   | 0.28 |       |      |
| S9  | 4.924    | 0.96 | 1.544 | 56.1 |
| S10 | 1.883    | 0.17 |       |      |
| S11 | Infinity | 0.30 | 1.517 | 64.2 |
| S12 | Infinity | 0.70 |       |      |
| img | Infinity |      |       |      |

In the lens module 100 of the present embodiment, the focal distance f1 of the first lens 10 is 3.23 mm; the focal distance f2 of the second lens 20 is −5.85 mm; the focal distance f3 of the third lens 30 is 5.46 mm; the focal distance f4 of the fourth lens 40 is −100.00 mm; the focal distance f5 of the fifth lens 50 is −6.31 mm; and the overall focal distance f is 4.16 mm. In addition, F No. of the present embodiment is 2.20, brighter than the first and second embodiments. However, TL according to the embodiment is 4.87, slightly larger than the first and second embodiments.

TABLE 6

| Surface No. | K | A | B | C | D | E | F |
|---|---|---|---|---|---|---|---|
| S1  | −4.734E−02 |  1.039E−02 | 9.817E−03 |  1.128E−02 | −3.620E−03 |  3.154E−03 |  1.005E−02 |
| S2  |  0.000E+00 | −1.480E−01 | 3.499E−01 | −4.657E−01 |  4.167E−01 | −1.825E−01 | −9.593E−11 |
| S3  |  0.000E+00 | −2.849E−01 | 4.791E−01 | −5.550E−01 |  4.056E−01 | −1.943E−01 |  7.842E−11 |
| S4  |  1.916E+00 | −1.879E−01 | 2.221E−01 | −1.494E−01 | −3.436E−02 |  3.671E−02 |  5.422E−11 |
| S5  |  0.000E+00 | −5.424E−02 | 1.372E−02 | −1.117E−01 |  1.591E−01 | −7.781E−02 | −6.676E−03 |
| S6  |  0.000E+00 |  2.355E−02 | 1.825E−02 | −9.312E−02 |  9.100E−02 | −3.215E−02 | −2.116E−03 |
| S7  | −3.555E+00 |  3.317E−02 | 6.449E−02 | −2.497E−02 |  1.728E−02 | −2.030E−02 |  5.935E−03 |
| S8  | −3.212E+00 | −3.105E−02 | 5.708E−02 |  1.093E−02 | −6.751E−03 | −3.138E−03 |  1.104E−03 |
| S9  | −1.756E+01 | −1.831E−01 | 9.539E−02 | −3.645E−02 |  1.111E−02 | −1.950E−03 |  1.375E−04 |
| S10 | −8.176E+00 | −7.204E−02 | 2.713E−02 | −8.822E−03 |  1.803E−03 | −2.120E−04 |  1.069E−05 |

Fourth Embodiment

The lens module 100 according to the fourth embodiment of the present invention will be described with reference to FIGS. 7, 8A, 8B, and 8C.

The lens module 100 according to the fourth embodiment may include the first lens 10 having positive refractive power, the second lens 20 having negative refractive power, the third lens 30 having positive refractive power, the fourth lens 40 having negative refractive power, and the fifth lens 50 having negative refractive power.

Here, the fourth lens 40 may have an inflection point at the peripheral portion thereof based the optical axis (C-C) like in the third embodiment.

TABLE 7

| Surface No. | Radius of Curvature | Thickness or Distance | Refractive Index | Abbe No. (v) |
|---|---|---|---|---|
| S1 | 1.421 | 0.64 | 1.544 | 56.1 |
| S2 | 4.647 | 0.08 | | |
| S3 | 3.052 | 0.25 | 1.632 | 23.4 |
| S4 | 1.803 | 0.49 | | |
| S5 | −167.850 | 0.48 | 1.544 | 56.1 |
| S6 | −2.394 | 0.16 | | |
| S7 | −0.971 | 0.36 | 1.635 | 24 |
| S8 | −1.128 | 0.43 | | |
| S9 | 4.527 | 0.67 | 1.544 | 56.1 |
| S10 | 1.673 | 0.21 | | |
| S11 | Infinity | 0.30 | 1.517 | 64.2 |
| S12 | Infinity | 0.81 | | |
| img | Infinity | | | |

In the lens module 100 of the present embodiment, the focal distance f1 of the first lens 10 is 3.52 mm; the focal distance f2 of the second lens 20 is −7.55 mm; the focal distance f3 of the third lens 30 is 4.46 mm; the focal distance f4 of the fourth lens 40 is −95.01 mm; the focal distance f5 of the fifth lens 50 is −5.32 mm; and the overall focal distance f is 4.21 mm. In addition, F No. and TL according to the embodiment are 2.20 and 4.87, respectively. F No. of the present embodiment is low, similarly to the case of the third embodiment, but TL according to the embodiment is slightly larger as compared with those of the first and second embodiments.

TABLE 8

| Surface No. | K | A | B | C | D | E | F |
|---|---|---|---|---|---|---|---|
| S1 | −5.367E−02 | 8.025E−03 | 1.514E−02 | 3.207E−03 | −7.845E−03 | 1.837E−02 | 0.000E+00 |
| S2 | 0.000E+00 | −1.984E−01 | 3.673E−01 | −4.480E−01 | 4.132E−01 | −1.994E−01 | 0.000E+00 |
| S3 | 0.000E+00 | −3.320E−01 | 4.807E−01 | −4.276E−01 | 2.646E−01 | −1.515E−01 | 0.000E+00 |
| S4 | 2.336E+00 | −1.899E−01 | 2.280E−01 | −8.781E−02 | −8.228E−02 | 3.671E−02 | 0.000E+00 |
| S5 | 0.000E+00 | −7.394E−02 | 2.007E−02 | −1.709E−01 | 2.681E−01 | −1.298E−01 | 0.000E+00 |
| S6 | 0.000E+00 | 5.194E−02 | −2.272E−02 | −4.804E−02 | 8.263E−02 | −3.874E−02 | 0.000E+00 |
| S7 | −3.411E+00 | 4.881E−02 | 6.940E−02 | −3.097E−02 | 1.160E−02 | −2.132E−02 | 8.095E−03 |
| S8 | −3.459E+00 | −1.721E−04 | 4.079E−02 | 4.433E−03 | −6.632E−03 | −2.549E−03 | 1.346E−03 |
| S9 | −1.756E+01 | −1.367E−01 | 4.374E−02 | −6.467E−03 | 4.294E−04 | −7.727E−07 | 0.000E+00 |
| S10 | −8.176E+00 | −6.509E−02 | 1.730E−02 | −3.737E−03 | 4.503E−04 | −3.085E−05 | 8.626E−07 |

Fifth Embodiment

The lens module 100 according to the fifth embodiment of the present invention will be described with reference to FIGS. 9, 10A, 10B, and 10C.

The lens module 100 according to the fifth embodiment may include the first lens 10 having positive refractive power, the second lens 20 having negative refractive power, the third lens 30 having positive refractive power, the fourth lens 40 having negative refractive power, and the fifth lens 50 having negative refractive power.

TABLE 9

| Surface No. | Radius of Curvature | Thickness or Distance | Refractive Index | Abbe No. (v) |
|---|---|---|---|---|
| S1 | 1.637 | 0.72 | 1.544 | 56.1 |
| S2 | 45.096 | 0.09 | | |
| S3 | 4.687 | 0.30 | 1.632 | 23.4 |
| S4 | 1.971 | 0.40 | | |
| S5 | −20.922 | 0.43 | 1.544 | 56.1 |
| S6 | −3.417 | 0.43 | | |
| S7 | −1.297 | 0.41 | 1.635 | 24 |
| S8 | −1.491 | 0.09 | | |
| S9 | 3.226 | 0.98 | 1.544 | 56.1 |
| S10 | 1.685 | 0.20 | | |
| S11 | Infinity | 0.30 | 1.517 | 64.2 |
| S12 | Infinity | 0.70 | | |
| img | Infinity | | | |

In the lens module 100 of the present embodiment, the focal distance f1 of the first lens 10 is 3.09 mm; the focal distance f2 of the second lens 20 is −5.56 mm; the focal distance f3 of the third lens 30 is 7.41 mm; the focal distance f4 of the fourth lens 40 is −91.69 mm; the focal distance f5 of the fifth lens 50 is −8.34 mm; and the overall focal distance f is 4.25 mm. In addition, F No. of the present embodiment is 2.20, brighter as compared with the first and second embodiments, but TL according to the embodiment is 5.05, the greatest among the accompanying embodiments.

TABLE 10

| Surface No. | K | A | B | C | D | E | F |
|---|---|---|---|---|---|---|---|
| S1 | −3.596E−01 | 1.165E−03 | 7.459E−03 | −2.742E−02 | 1.868E−02 | −4.584E−03 | −7.427E−03 |
| S2 | 0.000E+00 | −1.559E−01 | 3.396E−01 | −4.891E−01 | 3.692E−01 | −1.290E−01 | 0.000E+00 |
| S3 | 0.000E+00 | −2.524E−01 | 5.538E−01 | −6.911E−01 | 5.115E−01 | −1.753E−01 | 0.000E+00 |
| S4 | 1.265E+00 | −1.673E−01 | 3.220E−01 | −3.118E−01 | 2.376E−01 | −8.550E−02 | 0.000E+00 |
| S5 | 0.000E+00 | −1.078E−01 | 3.365E−01 | −5.060E−01 | 1.153E−01 | −7.499E−02 | 8.252E−03 |
| S6 | 0.000E+00 | −4.706E−02 | −2.680E−02 | 7.909E−02 | −3.231E−02 | 2.626E−02 | −1.321E−02 |
| S7 | −7.540E+00 | −7.308E−02 | 1.782E−02 | 6.047E−03 | 1.635E−02 | −1.995E−02 | 4.378E−03 |
| S8 | −6.736E+00 | −8.506E−02 | 2.676E−02 | 1.017E−02 | −2.270E−03 | −2.827E−03 | 7.803E−04 |
| S9 | −1.756E+01 | −7.900E−01 | 3.000E−01 | −7.265E−02 | 1.000E−02 | 1.450E−03 | 0.000E+00 |
| S10 | −8.176E+00 | −1.048E+00 | 7.922E−02 | −1.488E−02 | 7.258E−03 | 2.992E−04 | 0.000E+00 |

Table 11 shows main numerical values for the above-described embodiments.

All of the above-described embodiments 1 to 5 satisfy numerical limitations according to Mathematical Expressions 1 to 5, as shown in Table 11.

Here, the first and second embodiments may provide a relatively smaller TL than the other embodiments, while the third to fifth embodiments may provide a relatively brighter lens module than the other embodiments.

TABLE 11

| Note | First Embodiment | Second Embodiment | Third Embodiment | Fourth Embodiment | Fifth Embodiment |
|---|---|---|---|---|---|
| f | 4.12 | 4.12 | 4.16 | 4.21 | 4.25 |
| BFL | 1.20 | 1.21 | 1.17 | 1.32 | 1.20 |
| F No. | 2.40 | 2.40 | 2.20 | 2.20 | 2.20 |
| TL | 4.77 | 4.77 | 4.87 | 4.87 | 5.05 |
| FOV | 70.00 | 70.20 | 70.40 | 69.70 | 69.10 |
| f1 | 2.91 | 2.86 | 3.23 | 3.52 | 3.09 |
| f2 | −5.68 | −5.50 | −5.85 | −7.55 | −5.56 |
| f3 | 8.44 | 7.85 | 5.46 | 4.46 | 7.41 |
| f4 | −25.61 | −100.00 | −100.00 | −95.01 | −91.69 |
| f5 | −12.01 | −8.24 | −6.31 | −5.32 | −8.34 |
| f4/f | −6.22 | −24.27 | −24.04 | −22.57 | −21.57 |
| v1-v4 | 32.10 | 32.10 | 30.50 | 32.10 | 32.10 |
| f3/f2 | −1.49 | −1.43 | −0.93 | −0.59 | −1.33 |
| f4/f1 | −8.82 | −34.95 | −30.98 | −27.01 | −29.66 |
| TL/f | 1.16 | 1.16 | 1.17 | 1.16 | 1.19 |
| v2 | 23.40 | 23.40 | 23.40 | 23.40 | 23.40 |

An overall focal distance f of the lens module may satisfy the following conditional expression:

$$4.12 \text{ mm} \leq f \leq 4.25 \text{ mm}.$$

A thickness of the fifth lens may be thicker than a thickness of the third lens.

A radius r1 of curvature of an object-side surface of the first lens may satisfy the following conditional expression:

$$1.381 \text{ mm} \leq r1 \leq 1.637 \text{ mm}.$$

A curvature radius of the first lens on the object side is about 1.4 mm.

As set forth above, the lens module capable of realizing a high-resolution camera and a bright optical system can be provided.

While the present invention has been shown and described in connection with the embodiments, it will be apparent to those skilled in the art that modifications and variations can be made without departing from the spirit and scope of the invention as defined by the appended claims.

What is claimed is:

1. A lens module, comprising:
   a first lens having positive refractive power and being convex toward an object side;
   a second lens having negative refractive power and being concave toward an image side;
   a third lens having negative refractive power and being concave toward the object side and convex toward the image side;
   a fourth lens being concave toward the object side and convex toward the image side; and
   a fifth lens having negative refractive power and comprising an image-sided surface being concave in the center and convex at the periphery,
   wherein an overall focal distance f of the lens module satisfies the following conditional expression:

$$4.12 \text{ mm} \leq f \leq 4.25 \text{ mm, and}$$

wherein the first lens, the second lens, the third lens, the fourth lens and the fifth lens are sequentially arranged from the object side to the image side.

2. The lens module of claim 1, wherein a thickness of the fifth lens is thicker than a thickness of the third lens.

3. The lens module of claim 1, wherein a radius r1 of curvature of an object-side surface of the first lens satisfies the following conditional expression:

$$1.381 \text{ mm} \leq r1 \leq 1.637 \text{ mm}.$$

4. The lens module of claim 1, wherein a curvature radius of the first lens on the object side is about 1.4 mm.

5. The lens module of claim 1, further comprising an aperture arranged in front of the first lens.

6. The lens module of claim 5, wherein:
   the second lens is convex toward the object side,
   the first lens and the second lens are aspherical,
   the third and fourth lenses have a meniscus shape, and
   the fifth lens has at least one inflection point formed on a surface thereof on the image side.

7. A lens module, comprising:
   a first lens having positive refractive power and comprising a convex surface on an object side;
   a second lens having negative refractive power and comprising a convex surface on the object side and a concave surface on an image side;
   a third lens having negative refractive power and comprising a meniscus shape being concave toward the object side and convex toward the image side;
   a fourth lens comprising a meniscus shape being concave toward the object side and convex toward the image side; and
   a fifth lens having negative refractive power and comprising an image-sided surface being concave in the center and convex at the periphery, wherein an overall focal distance f of the lens module satisfies the following conditional expression:

4.12 mm≤f≤4.25 mm, and wherein the first lens, the second lens, the third lens, the fourth lens and the fifth lens are sequentially arranged from the object side to the image side.

8. The lens module of claim 7, wherein the convex surfaces of the first and second lenses and the concave surface of the second lens, and the meniscus shape of the third and fourth lens are arranged on an optical axis.

9. The lens module of claim 8, wherein a radius r1 of curvature of an object-side surface of the first lens satisfies the following conditional expression:

1.381 mm≤r1≤1.637 mm.

10. The lens module of claim 8, wherein a thickness of the fifth lens is thicker than a thickness of the third lens.

11. The lens module of claim 8, wherein a curvature radius of the first lens on the object side is about 1.4 mm.

12. The lens module of claim 8, further comprising an aperture arranged in front of the first lens.

13. A lens module, comprising:
a first lens having positive refractive power and being convex toward an object side;
a second lens having negative refractive power and being concave toward an image side;
a third lens having negative refractive power and being concave toward the object side and convex toward the image side;
a fourth lens being concave toward the object side and convex toward the image side; and
a fifth lens having negative refractive power and comprising a image-sided surface being concave in the center and convex at the periphery,
wherein a radius r1 of curvature of an object-side surface of the first lens satisfies the following conditional expression:

1.381 mm≤r1≤1.637 mm, and wherein the first lens, the second lens, the third lens, the fourth lens and the fifth lens are sequentially arranged from the object side to the image side.

14. The lens module of claim 13, wherein a thickness of the fifth lens is thicker than a thickness of the third lens.

15. The lens module of claim 13, wherein an overall focal distance f of the lens module satisfies the following conditional expression:

4.12 mm≤f≤4.25 mm.

16. The lens module of claim 15, wherein a curvature radius of the first lens on the object side is about 1.4 mm.

* * * * *